United States Patent [19]

Scheufler

[11] Patent Number: 4,481,408

[45] Date of Patent: Nov. 6, 1984

[54] COOKING APPARATUS

[76] Inventor: John H. Scheufler, 3940 Gresham, Ste. 315, San Diego, Calif. 92109

[21] Appl. No.: 549,088

[22] Filed: Nov. 7, 1983

[51] Int. Cl.$^3$ .............................................. H05B 3/68
[52] U.S. Cl. .................................... 219/460; 126/9 B; 126/25 B; 219/218; 219/261; 219/267; 219/386; D7/335; 99/450
[58] Field of Search ............... 219/214, 218, 260, 261, 219/267, 386, 400, 460, 461, 521, 10.55 A; 126/9 B, 9 R, 25 B, 25 R; D7/335; 99/443 R, 450; 108/150; 110/250

[56] References Cited

U.S. PATENT DOCUMENTS

| D. 270,987 | 10/1983 | Scheufler | D7/335 |
|---|---|---|---|
| 975,611 | 11/1910 | Fulghum | 126/9 B |
| 1,731,949 | 10/1929 | Span et al. | 219/218 |
| 2,662,966 | 12/1953 | Bruchhausen | 219/218 X |
| 2,815,427 | 12/1957 | Schaefer | 219/267 |
| 3,339,505 | 9/1967 | Bean | 126/25 B |
| 3,396,715 | 8/1968 | Allen | 219/261 X |
| 3,617,693 | 11/1971 | Shimosawa | 219/218 |
| 3,745,303 | 7/1973 | Epperson et al. | 219/218 |
| 3,765,397 | 10/1973 | Henderson | 126/25 R |
| 4,349,713 | 9/1982 | Marsen | 219/218 X |

Primary Examiner—Volodymyr Y. Mayewsky
Attorney, Agent, or Firm—Baker, Maxham, Callan & Jester

[57] ABSTRACT

A horizontally extending, hexagonally-shaped, metal platter defining a slightly upwardly convex cooking surface is supported on top of an upwardly diverging frustoconical hollow pot. The lower end of the pot rests on the top of an upwardly converging frustoconical hollow base. The platter extends horizontally beyond the upper end of the pot around the entire circumference of the pot. A charcoal or electric heat source within the pot causes air to be drawn through an intake vent in the base and heated gases to flow upwardly through the pot. The upper end of the pot has a plurality of V-shaped exhaust vents spaced around its entire circumference and the vents are sized so that the velocity of the heated gases rising through the pot and escaping through the exhaust vents is sufficient to insure that the outer periphery of the platter will be heated to a cooking temperature. A sauce dish is mounted in a central exhaust opening formed in the platter and may be rotated about a vertical axis to vary the degree of obstruction of the exhaust opening to thereby provide an exhaust baffle. The baffle can be used to increase or decrease the amount of heat to the platter and dish.

2 Claims, 9 Drawing Figures

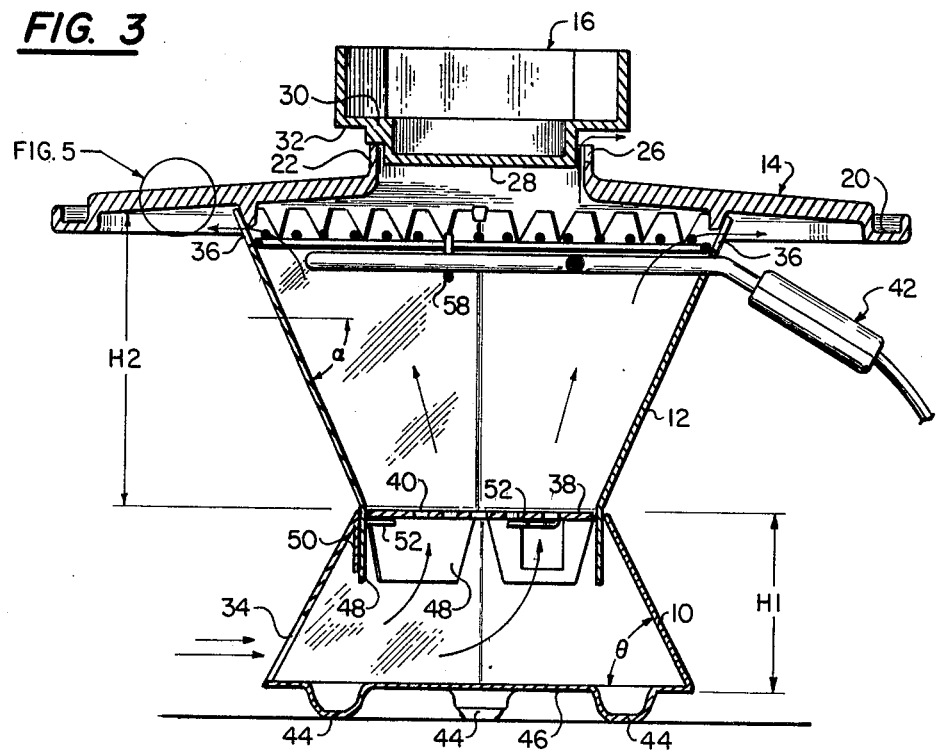
FIG. 3
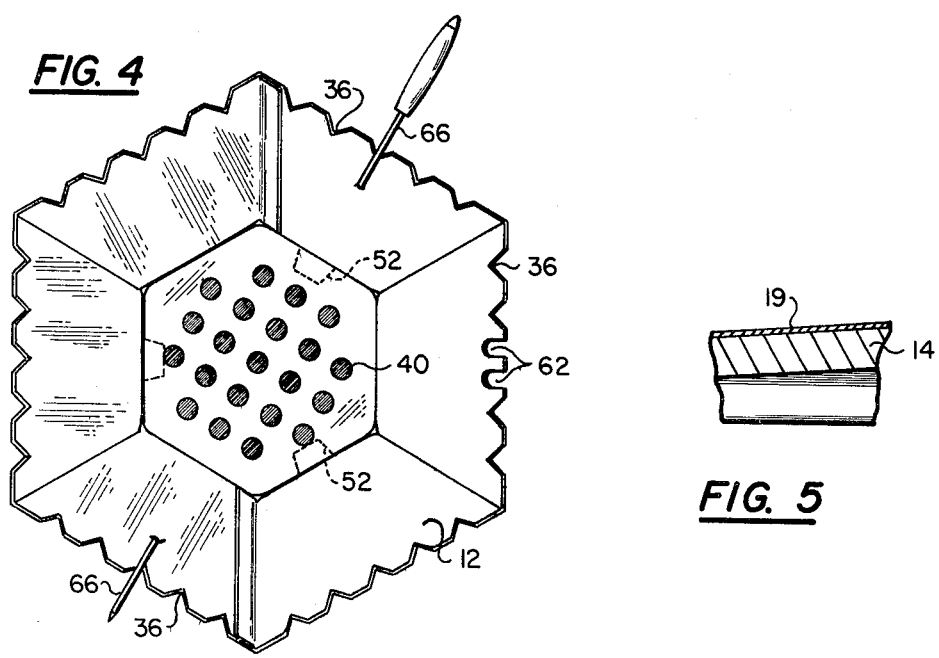
FIG. 4
FIG. 5

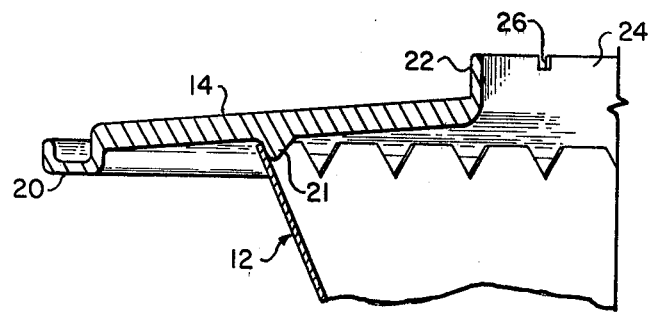
FIG. 6
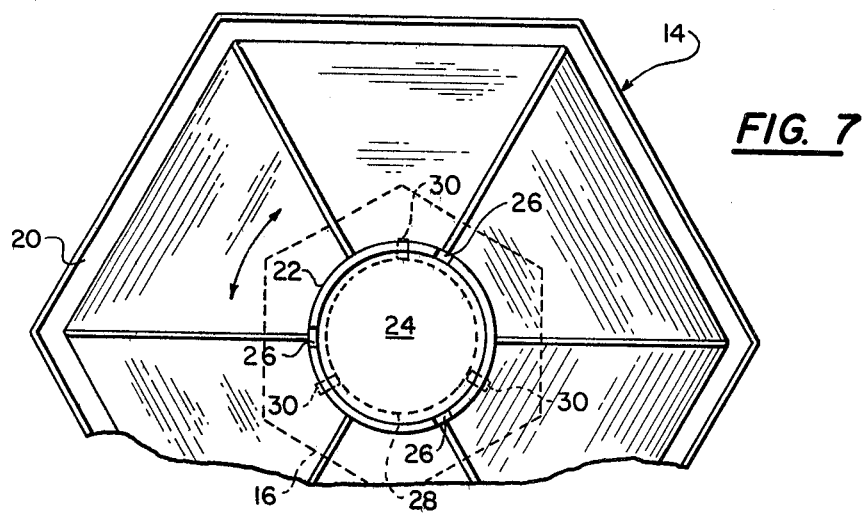
FIG. 7
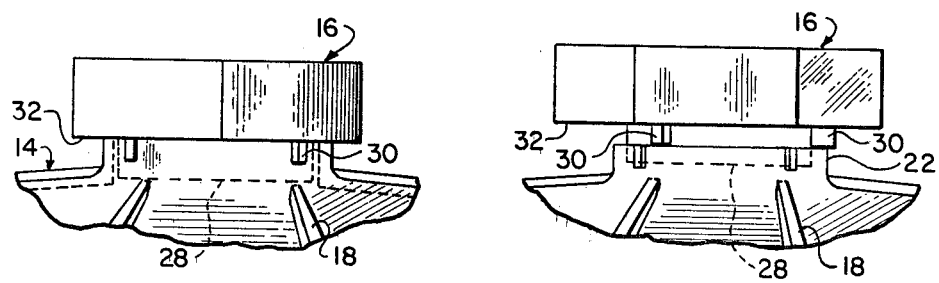
FIG. 8
FIG. 9

COOKING APPARATUS

BACKGROUND OF THE INVENTION

The present invention relates to barbecues, and more particularly, to a barbecue around which several people can sit and individually cook their food "hibachi" style.

There is an ever increasing desire for Oriental style cooking, and in particular for "hibachi" style cooking. According to this style, sliced chunks of beef, lamb, fowl, fish and vegetables are rapidly cooked on a hot griddle seasoned with various amounts of different liquids. A commercial (restaurant) variation of this style of Oriental cooking for a large number of people is performed on a so-called "Mongolian" barbecue which consists of a large, upwardly convex gas heated dome.

An entertaining way of having a dinner party is to serve a type of dinner where the guests can select and cook their food individually at the dinner table. For example, a fondue dinner permits the guests to dip individual pieces of bread, meat, fruit, etc, into a heated container in the center of the table containing melted cheese, hot oil, etc. It would be desirable to provide an analogous cooking apparatus which would permit dinner guests to cook almost any type of food individually at the dinner table hibachi style.

An ornamental design for such a cooking apparatus is disclosed in my U.S. Pat. No. Des. 270,987 granted Oct. 18, 1983.

SUMMARY OF THE INVENTION

Accordingly, it is the primary object of the present invention to provide an improved cooking apparatus.

Another object of the present invention is to provide a novel hibachi style cooking apparatus.

Another object of the present invention is to provide a novel hibachi style cooking apparatus which will permit dinner guests to each individually cook their own food at the dinner table, at the beach, or most any available cooking area.

Another object of the present invention is to provide a novel hibachi style cooking apparatus which will operate with both charcoal and electric heat sources.

Another object of the present invention is to provide a hibachi style cooking apparatus which can be readily assembled and disassembled for shipping and storage.

Another object of the present invention is to provide a hibachi style cooking apparatus which has a novel vent arrangement to insure uniform heating of its cooking surface when using both charcoal and electricity individually.

Still another object of the present invention is to provide a hibachi style cooking apparatus having a cooking platter that can be removed and replaced with a grill to permit conventional western-style barbecue cooking or shish kebab.

Further, another objective of the present invention is to provide easy cleaning nonstick cooking surfaces and ceramically coated exterior surfaces for easy cleaning.

In the illustrated embodiment of my invention a horizontally extending, hexagonally-shaped, metal platter defining a slightly upwardly convex cooking surface is supported on top of an upwardly diverging frustoconical hollow pot that is centralized by protruding points resting inside points of the pot. The lower end of the pot is inserted into the top of an upwardly converging frustoconical hollow base. The platter extends horizontally beyond the upper end of the pot around the entire circumference of the pot. A charcoal or electric heat source within the pot causes air to be drawn through an intake vent in the base and heated gases to flow upwardly through the pot. The upper end of the pot has a plurality of V-shaped exhaust vents spaced around its entire circumference and the vents are sized so that the velocity of the heated gases rising through the pot and escaping through the exhaust vents is sufficient to insure that the outer periphery of the platter will be heated to a cooking temperature whether cooking with charcoal or electricity. A sauce dish is mounted in a central exhaust opening formed in the platter and may be rotated about a vertical axis to vary the degree of obstruction of the exhaust opening to thereby provide an exhaust baffle to assist in regulating heat distribution.

BRIEF DESCRIPTION OF THE DRAWINGS

FIG. 3 is an enlarged vertical sectional view of the preferred embodiment of my cooking apparatus.

FIG. 4 is an enlarged top plan view of the pot of my cooking apparatus which supports its platter and illustrating the charcoal supporting grate mounted in the bottom of the pot.

FIG. 5 is a greatly enlarged fragmentary portion of the platter of the preferred embodiment of my cooking apparatus. The location of the enlarged portion of FIG. 5 is circled in FIG. 3.

FIG. 6 is an enlarged fragmentary vertical sectional view illustrating the manner in which the platter of the preferred embodiment of my cooking apparatus is held in position on the upper end of the pot.

FIG. 7 is an enlarged fragmentary plan view of the platter of the preferred embodiment of my cooking apparatus illustrating the sauce dish supported by the platter in phantom lines.

FIGS. 8 and 9 are greatly enlarged fragmentary side elevation views illustrating the manner in which the sauce dish can be rotated on top of the platter to vary the amount of obstruction of the exhaust opening in the center of the platter.

DESCRIPTION OF THE PREFERRED EMBODIMENT

Figure 1:
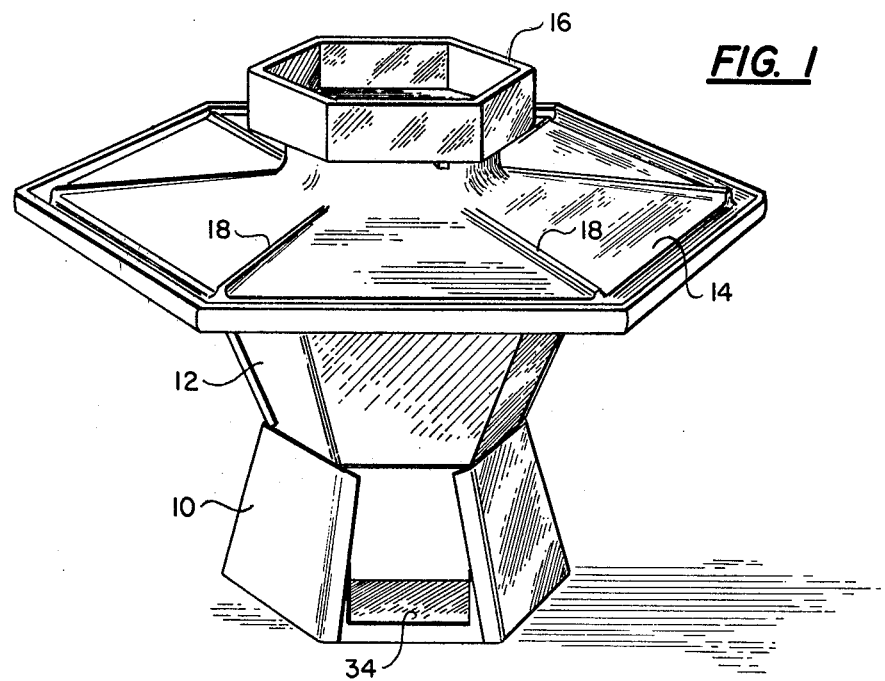
FIG. 1 is a perspective view of a preferred embodiment of my cooking apparatus.

Referring to FIG. 1, the preferred embodiment of my cooking apparatus includes an upwardly converging, frustoconical hollow base 10, an upwardly diverging frustoconical hollow pot 12 on top of the base, and a generally horizontally extending platter 14 supported on top of the pot. A sauce dish 16 is supported on top of the platter in the center thereof. The base, pot, platter and dish each have a hexagonal cross-sectional shape. The base 10 and pot 12 are preferably fabricated from sheet metal which is cut, folded and spot welded into the configurations illustrated. The sheet metal may be cold rolled steel, nonkiln, 0.059 inches thick stock (16 gauge). The platter 14 and sauce dish 16 (FIG. 1) are both preferably sand cast from 356 Aluminum. The base 10 and pot 12 preferably have a heat resistant color finish for easy cleaning and aesthetic appeal. The finish may consist of a prime coat of PORCELAINIZE material (0.003 inches minimum thickness) with an exterior color coat of PORCELAINIZE of 0.003 inches minimum thickness. The porcelain coats are applied according to Porcelain Enamel Institute Specification Number PEIS100 (625) entitled "Porcelainizing Enamel On Steel For External Use".

In its standard configuration illustrated in FIG. 1, the preferred embodiment of my cooking apparatus is utilized as follows. The unit is placed in the center of the eating area and guests sit around the unit. The platter 14 is heated by charcoal, electric heater or other heat source hereafter described. Soy, mustard, or most any other sauce is placed in the interior of the dish 16. Dinner guests then individually place chunks of beef, chicken, shrimp, sliced vegetables, etc. on their chosen segments of the upper cooking surface of the platter 14 which are separated by radially extending ribs 18. The cooking surfaces of the platter 14 and the inside surface of the dish 16 preferably have a coat 19 (FIG. 5) of a nonstick material such as that sold under the trademarks TEFLON or SILVERSTONE.

As illustrated in FIG. 6, the hexagonal-shaped platter 14 is upwardly convex. Each of its six upwardly facing cooking surfaces separated by the ribs 18 extends radially outwardly and downwardly from the center of the platter at an angle of approximately 2-½ degrees with respect to the horizontal. The periphery of the platter is formed with a lip 20 for catching oil or pieces of food. The platter has three downwardly directed projections 21 (FIG. 6) spaced to fit snugly within the upper end of the pot to hold the platter in proper alignment as illustrated in FIG. 3.

The center of the platter is formed with a cylindrical upward projection 22 (FIG. 6) which defines a central exhaust opening 24. The cylindrical projection 22 has three equally circumferentially spaced notches 26 (FIGS. 6 and 7). A cylindrical bottom portion 28 (FIGS. 7 and 9) of the sauce dish 16 fits within the central exhaust opening 24 of the platter. The outside diameter of the cylindrical bottom portion 28 of the dish is smaller than the inside diameter of the cylindrical projection 22 of the platter defining the exhaust opening 24. Three radially extending projections 30 (FIGS. 7 and 9) are formed on the outer circular surface of the bottom portion 28 of the sauce dish. The projections 30 are also equally circumferentially spaced, i.e. they are spaced approximately one-hundred and twenty degrees apart. The sauce dish 16 may be rotated about a vertical axis relative to the platter to vary the degree of obstruction of the exhaust opening, thus effectively providing an adjustable exhaust baffle.

When the sauce dish 16 is in the rotational orientation illustrated in FIG. 9, the radial projections 30 rest on the top edge of the cylindrical projection 22 defining the circular exhaust opening. This orientation is also illustrated in FIG. 7. In this orientation, hot exhaust gases from the interior of the pot 12 can flow between the bottom portion 28 of the sauce dish and the platter as illustrated by the arrow in FIG. 3. When the sauce dish is rotated as indicated by the arrows in FIG. 7 so that the radial projections 30 register with the notches 26, the dish drops to its position illustrated in FIG. 8. In this position, the bottom wall 32 (FIG. 3) of the dish rests against the top edge of the cylindrical projection 22 of the platter, thus effectively sealing the exhaust opening.

Figure 2:
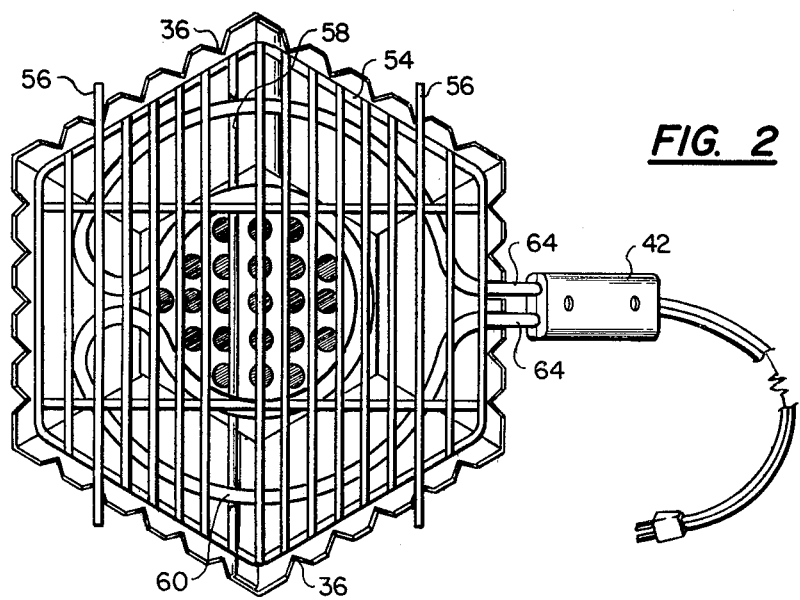
FIG. 2 is an enlarged top plan view of my cooking apparatus with its cooking platter removed and replaced with a grill having an electric heating element supported on the underside thereof.

The base 10 and pot 12 have a very particular construction to optimize airflow. Specifically, the base 10 has an intake vent 34 (FIG. 1). A plurality of V-shaped exhaust vents 36 (FIGS. 3 and 4) are formed in the upper edge of the pot 12. Together the base 10 and pot 12 generate a venturi effect. Ambient air is drawn into the base 10 through the intake vent 34 as illustrated by the arrows in FIG. 3. This air rises through a horizontal, hexagonal grate 38 (FIGS. 3 and 4). The grate has a plurality of holes 40 formed therein. The grate may support charcoal. An alternative heat source is provided by electric heater 42 (FIGS. 2 and 3).

The upwardly converging base 10 and the upwardly diverging pot 12 together form a duct arrangement which results in acceleration of the flow of gases therethrough as indicated by the arrows in FIG. 3. Preferably, the height of the base 10 is about two-thirds the height of the pot 12. Preferably, the vertical sidewalls of the base extend at an angle theta of approximately sixty degrees relative to horizontal and the vertical sidewalls of the pot extend at an angle alpha of approximately sixty-five degrees relative to horizontal. The base can be removed from the pot, inverted, and placed in the pot for storage or shipment. The height H1 of the base 10 may be four inches and the height H2 of the pot 12 may be six inches.

The platter 14 extends beyond the upper end of the pot 12 as illustrated in FIG. 3. The overhanging area of the platter is heated both by conduction of heat from the central portion of the platter and by the heated gases expelled through the V-shaped exhaust vents 36 as illustrated by the arrows in FIG. 3. The exhaust vents 36 are sized so that the velocity of the heated gases rising through the pot and escaping through the exhaust vents is sufficient to insure that the outer periphery of the platter will be heated to a cooking temperature. Preferably, each of the V-shaped exhaust vents 36 measures approximately one-half inch along its base and approximately three-quarters of an inch along its sides for the size of base and pot previously given.

Base 10 has three feet 44 (FIG. 3) spaced in triangular arrangement to give the cooking apparatus firm support. The feet 44 may be formed by deforming or stamping downward projections from the flat bottom wall 46 of the base. Six vertical flanges 48 (FIG. 3) extend downwardly from the lower end of the pot. A vertical flange 50 extends downwardly from the upper end of every other sidewall of the base 10. The flanges 48 and 50 are spaced so that the lower end of the pot 12 can be inserted into the upper end of the base 10 and the flanges 48 and 50 will overlap to hold the base and pot together. Three of the flanges 48 at the lower end of the pot 12 have inwardly bent, horizontal tabs 52 (FIGS. 3 and 4) formed from cut out regions of the flanges 48. The horizontal grate 38 rests on top of the tabs 52 as illustrated in FIG. 4.

A grill 54 (FIG. 2) has a plurality of elongate members 56 spaced so that they may be received in individual ones of the V-shaped exhaust vents 36 for supporting the grill horizontally across the upper end of the pot 12. The grill has a support 58 (FIGS. 2 and 3) for removably receiving the main portion 60 of the heat element of electric heater 42. The support 58 may comprise one of the cross bars of the grill which is bent downwardly in a U-shaped configuration to hold the main portion 60 of the heat element on the underside of the grill. The pot 12 has a pair of adjacent slots 62 (FIG. 4) formed in the upper edge thereof for receiving the terminal portions 64 of the heat element as illustrated in FIG. 2.

The preferred embodiment of my cooking apparatus may be utilized outdoors in its standard configuration illustrated in FIG. 1 in which food is cooked on the upper cooking surfaces of the platter 14. In this configuration, the heat source may be burning charcoal or wood supported on top of the grate 38. The grill 54 is preferably not in place. If the apparatus is to be utilized in its standard configuration indoors, the grill and electric heater 42 may be installed with the electrical element resting on top of the grill and below the platter.

If a conventional western-style barbecue is desired, and the apparatus is to be used outdoors, charcoal or wood may be placed on top of the grate 38 and only the grill 54 is positioned on top of the pot. This will permit hamburgers, steaks, chicken, hot dogs or other meats to be barbecued. When the apparatus is utilized outdoors with charcoal or wood as a heat source, the grill 54 may be removed and shish kebab supported by skewers 66 (FIG. 4) may be held in parallel alignment above the fire by resting the skewers in the V-shaped exhaust vents. The apparatus can be used for western-style barbecuing indoors by utilizing the electric heater 42 as a heat source in combination with the grill 54 as illustrated in FIG. 2. The dish 16 may also be used for fondue, desserts, and many other food preparations.

Having described a preferred embodiment of my cooking apparatus, it should be understood that modifications and adaptations thereof will occur to those skilled in the art. Accordingly, the protection afforded my invention should only be limited in accordance with the scope of the following claims.

I claim:

1. A cooking apparatus comprising:
   an upwardly converging hollow metal base;
   an upwardly diverging hollow metal pot having a lower end connected to an upper end of the base;
   a metal platter removably mountable over an upper end of the pot so that it extends generally horizontally and provides an upwardly facing cooking surface;
   an air intake vent in the base;
   a plurality of exhaust vents formed along an edge defining the upper end of the pot;
   an exhaust opening formed in the center of the platter;
   a metal dish mounted in the exhaust opening in the platter and configured so that selective rotation thereof about a vertical axis will vary the degree of obstruction of the exhaust opening;
   metal grate means extending horizontally between the base and the pot for supporting a combustible material for providing a source of cooking heat;
   a metal grill having a plurality of spaced apart elongate members having ends removably receivable in individual ones of the exhaust vents so that the grill may be supported horizontally across the upper end of the pot beneath the platter;
   an electric heater having a handle and a heat element having a main portion shaped in the form of a closed curve and two terminal portions which extend into the handle;
   the grill having metal supports on its lower side for removably receiving and supporting the main portion of the heat element; and
   the pot having a pair of slots formed on the edge defining the upper end of the pot for receiving and supporting the terminal portions of the heat element;
   whereby the apparatus may be utilized outdoors by igniting wood or charcoal on the grate and cooking on the platter or by removing the platter and cooking on the grill, or alternatively, the apparatus may be utilized indoors by inserting the electric heater beneath the grill, connecting the electric heater to a source of electric power, and cooking on the grill with the platter removed, or cooking on the platter when installed on top of the pot, grill and electric heater.

2. An apparatus according to claim 1 wherein the platter extends horizontally past the upper edges of the pot and the pot, base, intake vent and exhaust vents are sized and configured so that the velocity of heated gases rising through the pot and escaping through the exhaust vents is sufficient to insure that the other periphery of the platter will be heated to a cooking temperature.

* * * * *